(12) United States Patent
Maddali et al.

(10) Patent No.: US 8,661,494 B2
(45) Date of Patent: Feb. 25, 2014

(54) METHOD AND SYSTEM FOR PRESENTING MEDIA VIA A SET-TOP BOX

(75) Inventors: Balamuralidhar Maddali, Chennai (IN); T. Sahaya George, TamilNadu (IN); Madankanth Lanka, Andhra Pradesh (IN); Chaitanya Kumar Behara, Andhra Pradesh (IN); Venkatasrinivas Namburi, Andhra Pradesh (IN); Abhishek Malhotra, Saharanpur (IN); Anil Kumar Yanamandra, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 12/833,610

(22) Filed: Jul. 9, 2010

(65) Prior Publication Data

US 2012/0011558 A1   Jan. 12, 2012

(51) Int. Cl.
*H04N 7/173* (2011.01)
(52) U.S. Cl.
USPC ............................... 725/131; 725/38; 725/62

(58) Field of Classification Search
USPC ............................................. 725/131, 38, 62
See application file for complete search history.

(56) References Cited

U.S. PATENT DOCUMENTS

| | | | |
|---|---|---|---|
| 7,685,341 B2 * | 3/2010 | Steinberg et al. | 710/72 |
| 2004/0260921 A1 * | 12/2004 | Treadwell | 713/150 |
| 2006/0200744 A1 * | 9/2006 | Bourke et al. | 715/500.1 |
| 2008/0141313 A1 * | 6/2008 | Kato et al. | 725/62 |
| 2008/0307455 A1 * | 12/2008 | Praest | 725/38 |
| 2011/0261819 A1 * | 10/2011 | Mark et al. | 370/392 |

* cited by examiner

*Primary Examiner* — Jivka Rabovianski

(57) ABSTRACT

An approach is provided for presenting media via a set-top box. A set-top box detects a wireless device according to a predetermined communication protocol. A communication channel is established with the wireless device according to the communication protocol. A command message is received, according to the communication protocol, from the wireless device over the communication channel, wherein the command message specifies playback of media resident on the wireless device via the set-top box.

19 Claims, 14 Drawing Sheets

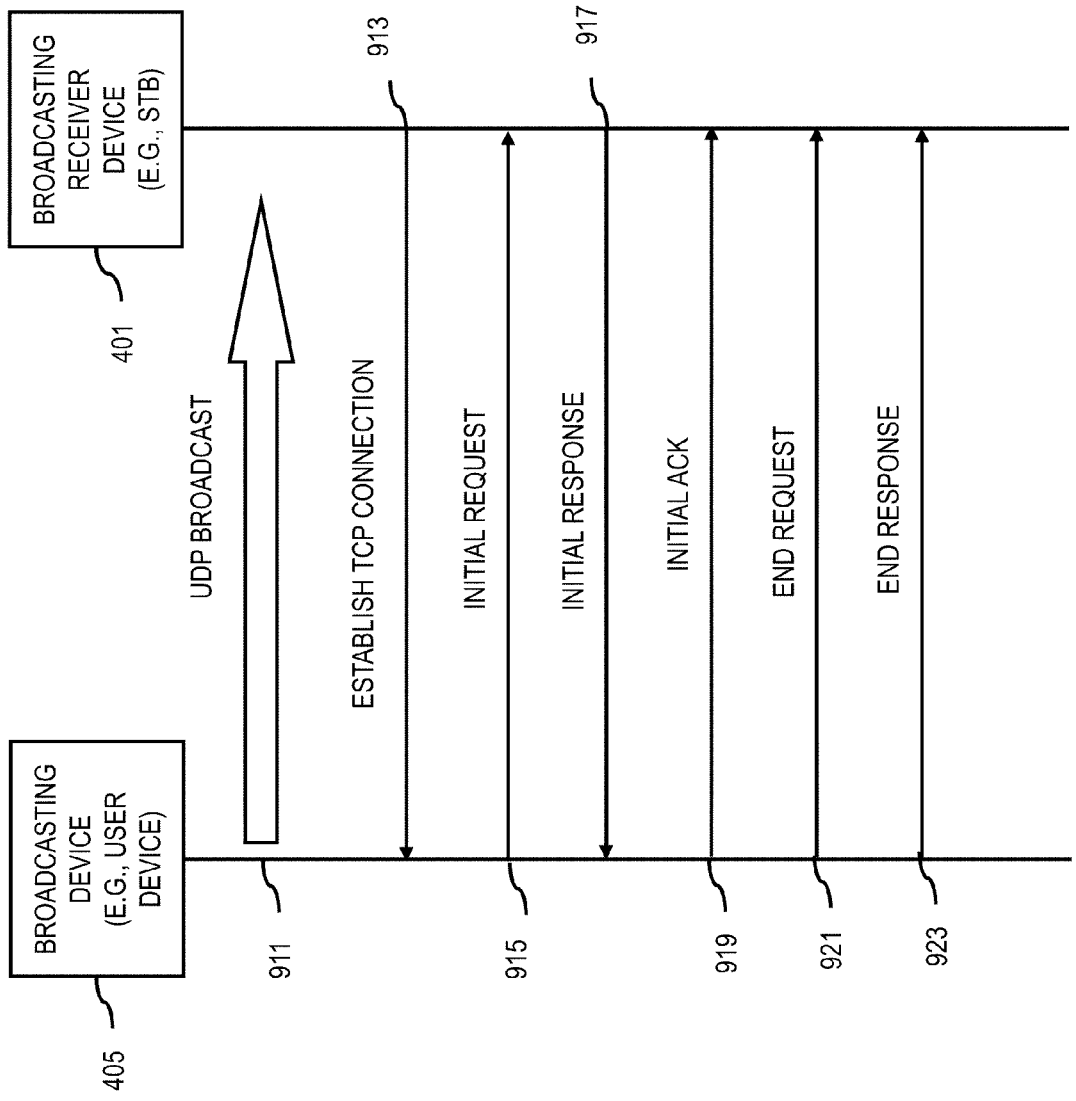

METHOD AND SYSTEM FOR PRESENTING MEDIA VIA A SET-TOP BOX

BACKGROUND INFORMATION

With the convergence of telecommunications and media services, there is increased competition among service providers to offer more services and features to consumers, and concomitantly develop new revenue sources. For instance, traditional telecommunication companies are entering the arena of media services that have been within the exclusive domain of cable (or satellite) television service providers. Television remains the prevalent global medium for entertainment and information. Concurrently, media services have enjoyed great success in other industries, such as portable media devices (e.g., personal digital assistants (PDAs), MP3 players, mobile phones, etc.), audio streaming services, video streaming, etc. Unfortunately, little or no attention has been paid to the integration of the various mediums to support the seamless sharing and experience of media. Traditionally, television service providers has offered limited user interaction with set-top boxes, other than through a conventional infrared remote controller to control selection of programs.

Therefore, there is a need for an approach to conveniently present media from one device to another device, e.g., set-top box.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 9A-9D are flowcharts of processes for establishing communication between a user device and a set-top box, according to various embodiments;

DESCRIPTION OF THE PREFERRED EMBODIMENT

A preferred apparatus, method, and system for presenting media via a set-top box are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
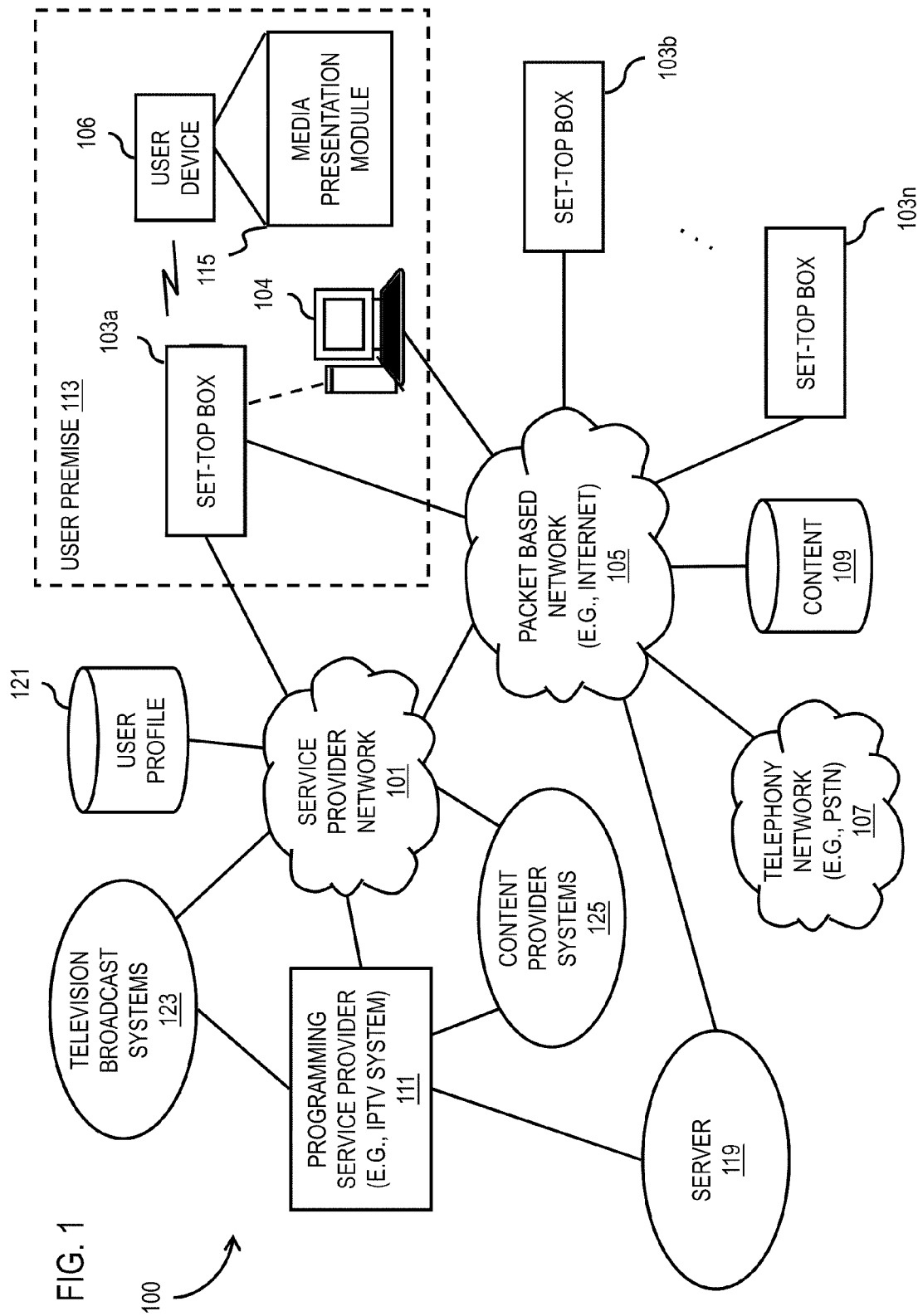
FIG. 1 is a diagram of a system capable of presenting media associated with a user device via a set-top box (STB), according to an exemplary embodiment.

FIG. 1 is a diagram of a system capable of presenting media associated with a user device via a set-top box, according to an exemplary embodiment. It is observed that even with the advent of the Internet and high-speed data connections, television remains the prevalent global medium for entertainment and information. In fact, as traditional television programming (e.g., "over-the-air" programming, cable programming, satellite programming, etc.) merges with the online content (e.g., network-streamed content, on-demand content, Internet programming, media-sharing websites, etc.), the available programming choices are likely to continue to grow without any true bounds. It is also recognized that the versatility of user devices, such as mobile phones equipped with cameras and audio/video players, have resulted in users becoming a prolific source or generator of media. However, no such media convergence is available for user devices, which may contain media that the user has created, purchased, or otherwise accumulated. Such problem stems, in part, from the lack of connectivity between the user devices and set-top boxes. Moreover, there have not been any development regarding the protocol mechanisms to facilitate the convenient and efficient transfer of data.

To address this problem, the system 100 of FIG. 1 enables the presentation, via a set-top box, of media resident on a user device. Specifically, the user device can initiate a slideshow or digital frame mode of operations on the set-top box, whereby the media resides within the user device. Also, the set-top box can provide a mode of presenting the media in a "digital media frame" mode, wherein the slideshow can be looped to as to effectively convert the display to a digital frame. In certain embodiments, a user device may be any type of computer device or mobile device. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

As shown in FIG. 1, the system 100 can be configured to present media (as a slideshow, which can be part of a digital frame mode of operations) via a set-top box that is managed by a service provider over network 101. According to certain embodiments, a "slideshow" refers to presentation of media in a sequence that can be pre-ordered, randomized, or a combination thereof. Also, if the media are of different types (e.g., image, textual, audio, video, etc.), they may be presented concurrently—e.g., a sequence of images with one or more audio files played during the presentation of the images. Moreover, the slideshow can be invoked in conjunction with a digital frame mode of operations. Under this mode, the set-top box can repeat (or loop) the sequence of media during periods of inactivity of other applications—e.g., when the set-top box 103a is not presenting programs, is being powered down, etc.

In the example of FIG. 1, service provider network 101 integrates the television medium with that of the telecommunications, computing, and media environments, thereby broadening the scope of devices and sources available to individuals for obtaining programming content or other media. By way of example, service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 103a-103n and/or terminal 104 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103a-103n to various sources of media content. Although depicted in FIG. 1 as separate networks, packet-based network 105 and/or telephony network 107 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

STBs 103a-103n may be used alone or in combination with one or more end terminal(s) 104 to implement various exemplary embodiments relating to presentation of a slideshow of media that reside within user device 106. Under the scenario of FIG. 1, user premise 113 includes user device 106 and terminal 104. As shown, user device 106 and/or terminal 104 posses a media presentation module 115, which is configured to transfer media from the respective device to set-top box 103a. As will be more fully described later, set-top box 103a can wirelessly (e.g., using Wi-Fi) detect presence of terminal 104 (assuming terminal is so configured to communicate wirelessly) and user device 106 in response to a broadcast message triggered by invocation of the media presentation module 115. Thereafter, set-top box 103a can receive instructions or commands from terminal 104 or user device 106 to present a slideshow that utilizes the transferred media (which can reside within either terminal 104 or device 106).

By way of example, STB 103a-103n, as well as terminal 104, can remotely access one or more servers (e.g., server 119), via a communication interface (not illustrated), configured to execute multiple instances of a media slideshow application. That is, the media slideshow application may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., packet-based network 105). For example, exemplary embodiments of media slideshow application may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 111. As such, multiple users, interfaces, and instances of the media slideshow application can be simultaneously realized through system 100.

In the example of FIG. 1, STBs 103a-103n are located at one or more user premises (e.g., user premise 113), and geospatially associated with one or more regions. STBs 103a-103n may be configured to communicate with and receive signals and/or data streams from a programming service provider 111 (or other transmission facility). These signals include results of applying search or browse operations on the available programming content (e.g., video assets) and related date (e.g., programming guide data, metadata) retrieved over a data network (e.g., service provider network 101, packet-based network 105, and/or telephony network 107), as well as conventional video broadcast content.

In one embodiment, the service provider can provide the media presentation in form of a slideshow as a service. As such, a user profile repository 121 may be employed to maintain subscribers to this service. User profile repository 121 along with content repository 109, or server 119 may be accessed via one or more service provider networks 101 and/or packet-based networks 105. In one embodiment, the user profile repository 121 stores user settings, preferences, and configuration information for the slideshow service. Further, service provider network 101 may include a system administrator (not shown) for operational and management functions to deploy the virtual channel service using, for instance, an internet protocol television (IPTV) system. In this manner, STBs 103a-103n can utilize any suitable technology to draw, receive, and/or transmit media content from/ to a programming service provider 111 or other content source/sink. A more detailed explanation of an exemplary STB is provided with respect to FIG. 2.

In an exemplary embodiment, STBs 103a-103n can draw, receive, and/or transmit programming guide information and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103a-103n either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103a-103n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Moreover, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In other embodiments, authentication procedures on a first device (e.g., STB 103a) may identify and authenticate a second device (e.g., terminal 104) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., STB 103a) may receive new programming content or guide information from a second source, whereas the previous session may be automatically closed when the "old" or prior certificates associated with the first source are revoked. This enables users to initiate secure sessions at any given STB 103a-103n (or end terminal 104) linked to system 100, whether or not the STB (or end terminal) belongs to that individual user. It is additionally contemplated that multiple rights sessions may exist concurrently.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 107. While system 100 is illustrated in FIG. 1, the exemplary components are not intended to be limiting, and indeed, additional or alternative components and/or implementations may be utilized.

Although the user equipment is described with respect to an STB 103, it is contemplated that various embodiments have applicability to any device capable of processing video, audio, and/or multimedia streams.

Figure 2:
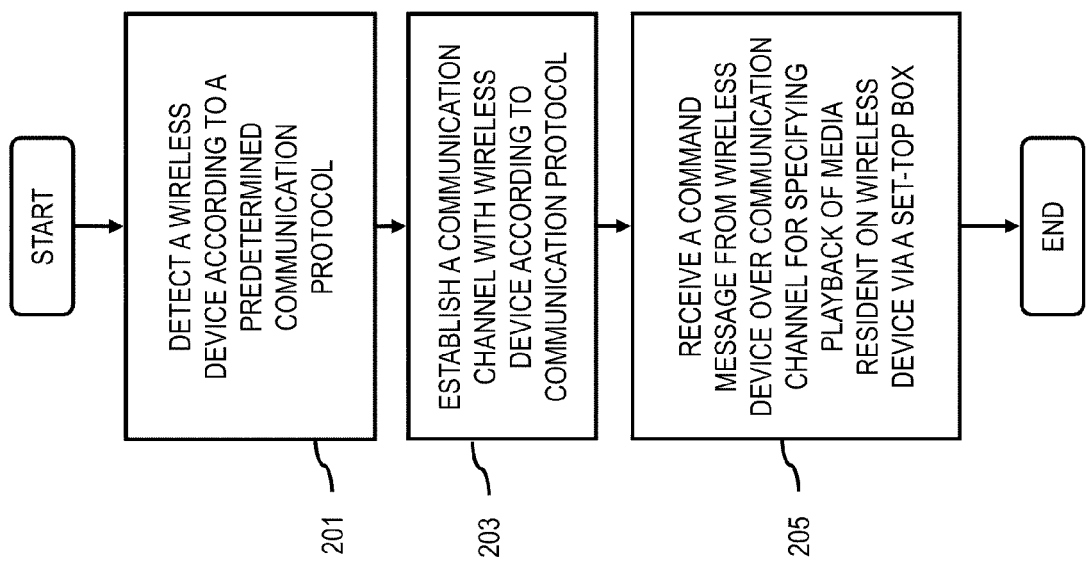
FIG. 2 is a flowchart of a process for media presentation via a set-top box using media that is resident on a user device, according to an exemplary embodiment.

FIG. 2 is a flowchart of a process for media presentation via a set-top box using media that is resident on a user device, according to an exemplary embodiment. Continuing with the example of FIG. 1, set-top box 103*a*, per step 201, detects a wireless device (e.g., user device 106) according to a predetermined communication protocol. According to one embodiment, this protocol is a Simple and Extensible Transmission Protocol (SETP). In general, this protocol can be used to enable communication between two devices. The communication can involve in sending commands, data and events. SETP provides device detection and bonding as well as handling of command messages and data messages. Advantageously, the protocol is designed to be simple, as to accommodate the constraints associated with portable (or mobile) devices; such devices are typically constrained by battery life and processing power.

In step 203, STB 103*a* establishes a communication channel with user device 106 using the communication protocol. Details of the establishment of the communication channel is provided with respect to FIGS. 9A-9D. Next, set-top box 103*a* receives a command message, as in step 205, from user device 106 over the established channel. The command, for instance, can instruct the STB 103*a* to accept transfer of the media that is stored within the user device 106, and to playback the media. The command can also specify certain parameters associated with the slideshow; e.g., duration of each media to be played, order of the media, arrangement of the media on the display, etc. In one embodiment, the playback can be in form of a digital media frame. In this mode of operation, the media content (e.g., images, video, audio, etc.) is cycled for presentation until the user or another application halts the process. It is contemplated that this digital media frame mode can be entered when the set-top box 103*a* is not engaged in presenting a program; for example, this slideshow can be triggered by a power off signal for deactivating set-top box 103*a*. It is contemplated that the digital media frame process can be executed by terminal 104, e.g., PC, according to an alternative embodiment.

Figure 3:
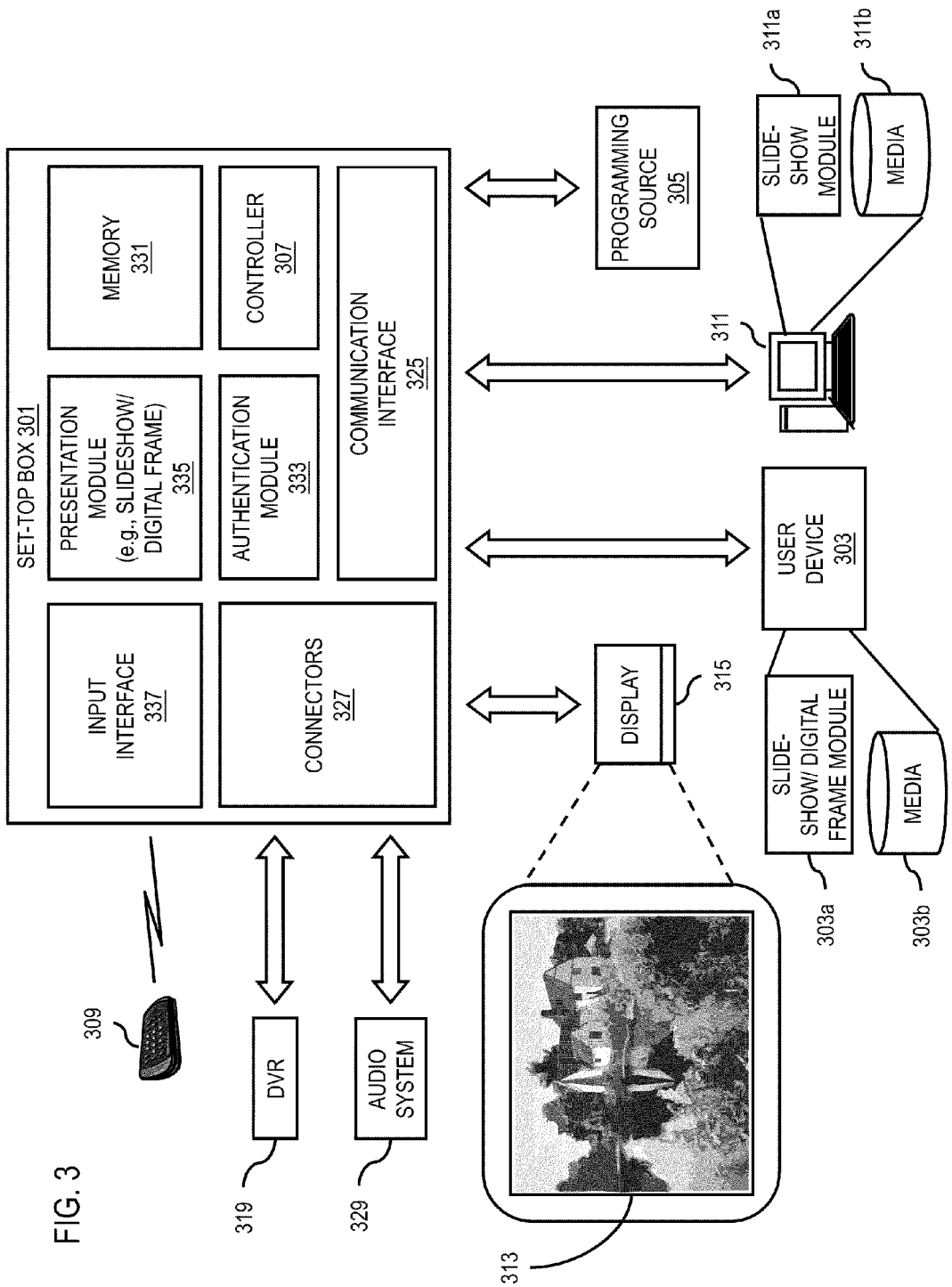
FIG. 3 is a diagram of a set-top box configured to provide media presentation utilizing media from a user device, according to an exemplary embodiment.

FIG. 3 is a diagram of a set-top box configured to provide media presentation utilizing media from a user device, according to an exemplary embodiment. STB 301 may utilize any suitable technology to receive media from user device 303, as well as one or more content streams from a programming source 305, such as the IPTV system of FIG. 1. In this example, user device 303 includes a slideshow module 303*a* and media 303*b*.

STB 301 may comprise computing hardware (such as described with respect to FIG. 8) and include additional components configured to provide specialized services related to the ranking and presentation of video assets in a graphical user interface. In addition, STB 301 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 3, the functions and operations of STB 301 may be governed by a controller 307 that interacts with each of the STB components to provide programming guide information and related content retrieved from an audio or video-sharing site, as well as from another STB device or component of system 100. In turn, the user may be afforded greater functionality utilizing a control device 309 to control the personalized programming guide service and related services, as will be more fully described below.

STB 301 may be configured to communicate with a number of user devices, including: a PC 311, laptops, PDAs, cellular phones (e.g., device 303), mobile devices, handheld devices, as well as any other equivalent technology capable of capturing and storing media. According to another embodiment, computer 311, as a user device, can also be configured with a slideshow module 311*a* to transfer media 311*b* to STB 301 for presentation to display 315.

As such, STB 301 may be configured to provide a slideshow on (or at) display 315. In one embodiment, presentation of the media (or content) may include: displaying, recording, playing, rewinding, forwarding, toggling, selecting, zooming, or any other processing technique that enables users to manipulate the media. For instance, STB 301 may provide one or more signals to the display 315 (e.g., television) so that the display 315 may present the media, as images, audio, video, or any combination thereof. A communication interface (not illustrated) of PC 311 may be configured to retrieve the programming and content information over the data network (e.g., packet-based network 105), wherein STB 301 may receive a programming content stream from PC 311 to present to the user via display 315.

STB 301 may also interact with a PVR, such as digital video recorder (DVR) 319, to store received content that can then be manipulated by a user at a later point in time. In various embodiments, DVR 319 may be network-based, e.g., included as a part of the service provider network 101, co-located at a subscriber site having connectivity to STB 301, and/or integrated into STB 301.

Furthermore, STB 301 may include a communication interface 325 configured to receive content streams from the programming service provider 111, PC 311, server (not shown), or other programming content source, such as media source 303. Communication interface 325 may optionally include single or multiple port interfaces. For example, STB 301 may establish a broadband connection to multiple sources transmitting content to STB 301 via a single port, whereas in alternative embodiments, multiple ports may be assigned to the one or more sources. In still other embodiments, communication interface 325 may be configured to permit users, via STB 301, to transmit data (including media content) to other users with STBs, a programming service provider 111, or other content source/sink.

According to various embodiments, STB 301 may also include inputs/outputs (e.g., connectors 327) to display 315 and DVR 319, as well as an audio system 329. In particular, audio system 329 may comprise a conventional audio-video receiver capable of monaural or stereo sound, as well as multichannel surround sound. Audio system 329 may include speakers, ear buds, headphones, or any other suitable component configured for personal or public dissemination. As such, STB 301, display 315, DVR 319, and audio system 329, for example, may support high resolution audio and/or video streams, such as high definition television (HDTV) or digital theater systems high definition (DTS-HD) audio. Thus, STB 301 may be configured to encapsulate data into a proper format with required credentials before transmitting onto one or more of the networks of FIG. 1 and de-encapsulate incoming traffic to dispatch data to display 315 and/or audio system 329.

In an exemplary embodiment, display 315 and/or audio system 329 may be configured with internet protocol (IP) capability (i.e., includes an IP stack, or is otherwise network addressable), such that the functions of STB 301 may be assumed by display 315 and/or audio system 329. In this manner, an IP ready, HDTV display or DTS-HD audio system may be directly connected to one or more service provider networks 101, packet-based networks 105, and/or telephony networks 107. Although STB 301, display 315, DVR 319, and audio system 329 are shown separately, it is contemplated that these components may be integrated into a single component, or other combination of components.

An authentication module 333 may be provided at STB 301 to initiate or respond to authentication schemes of, for instance, service provider network 101 or various other content providers, e.g., broadcast television systems 123, third-party content provider systems 125, or servers 119. Authentication module 333 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 301 may identify and authenticate a second device (e.g., PC 311) communicatively coupled to, or associated with, STB 301, or vice versa. Further, authentication information may be stored locally at memory 331, in a repository (not shown) connected to STB 301, or at a remote repository, e.g., user profile repository 121.

Authentication module 333 may also facilitate the reception of data from single or disparate sources. For instance, STB 301 may receive broadcast video from a first source (e.g., IPTV system 111), signals from a second source (e.g., server 119), and a programming content stream from a third source accessible over a data network (e.g., content repository 109). As such, display 315 may present the broadcast video, slideshow application, and programming content stream to the user. This presentation may be experienced separately, concurrently, in a toggled fashion, or with zooming, maximizing, minimizing, or trick capabilities, or equivalent mode.

Connector(s) 327 may provide various physical interfaces to display 315, audio system 329, as well as other peripherals; the physical interfaces may include, for example, RJ45, RJ11, high definition multimedia interface (HDMI), optical, coax, FireWire, wireless, and universal serial bus (USB), or any other suitable connector. The presentation module 335 may also interact with a control device 309 for determining particular media content that a user desires to experience; in one embodiment, slideshow functionalities may be incorporated in this presentation module 335. In an exemplary embodiment, the control device 309 may comprise a remote control (or other access device having control capability, such as a PC 311, wireless device, mobile phone, etc.) that provides a user with the ability to readily manipulate and dynamically change parameters affecting the slideshow. In other examples, STB 301 may be configured for voice recognition such that STB 301 may be controlled with spoken utterances.

In addition to the user device 303 being configured to control the manner in which STB 301 presents the slideshow, STB 301 may also permit control device 309 to affect invocation and presentation of the slideshow. In this manner, control device 309 may include (not shown) a cursor controller, trackball, touch screen, touch pad, keyboard, and/or a key pad for activating a slideshow application, selecting programming content, as well as performing other control functions. Control device 309 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 309 may comprise a memory (not illustrated) for storing preferences relating the slideshow application; such preferences can be conveyed to STB 301 through an input interface 337. The input interface 337 may support any type of wired and/or wireless link, e.g., infrared, radio frequency (RF), BLUETOOTH™, and the like. Thus, control device 309 may store user preferences with respect to the parameters associated with slideshow presentation. Alternatively, user preferences may be tracked, recorded, or stored in STB 301 or in a network user profile repository 121. The preferences may be automatically retrieved and activated by a user at any time. It is noted that the control device 309 may be separate from STB 301 or may be integrated within STB 301 (in which case certain input interface hardware and/or software may not be necessary).

Particular embodiments enable users, via control device 309, to populate or otherwise configure a user profile. For instance, a user profile application may be provided or accessed by STB 301 to enable users to populate a plurality of entry fields with user information. A user profile may include one or more customized or personalized settings relating to the slideshow application, as well as other content and applications. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

Thus, under arrangements of FIGS. 1 and 3, a user may create, experience (e.g., locate, specify, and receive), as well as share (e.g., transmit) media in form of a slideshow application.

Figure 4:
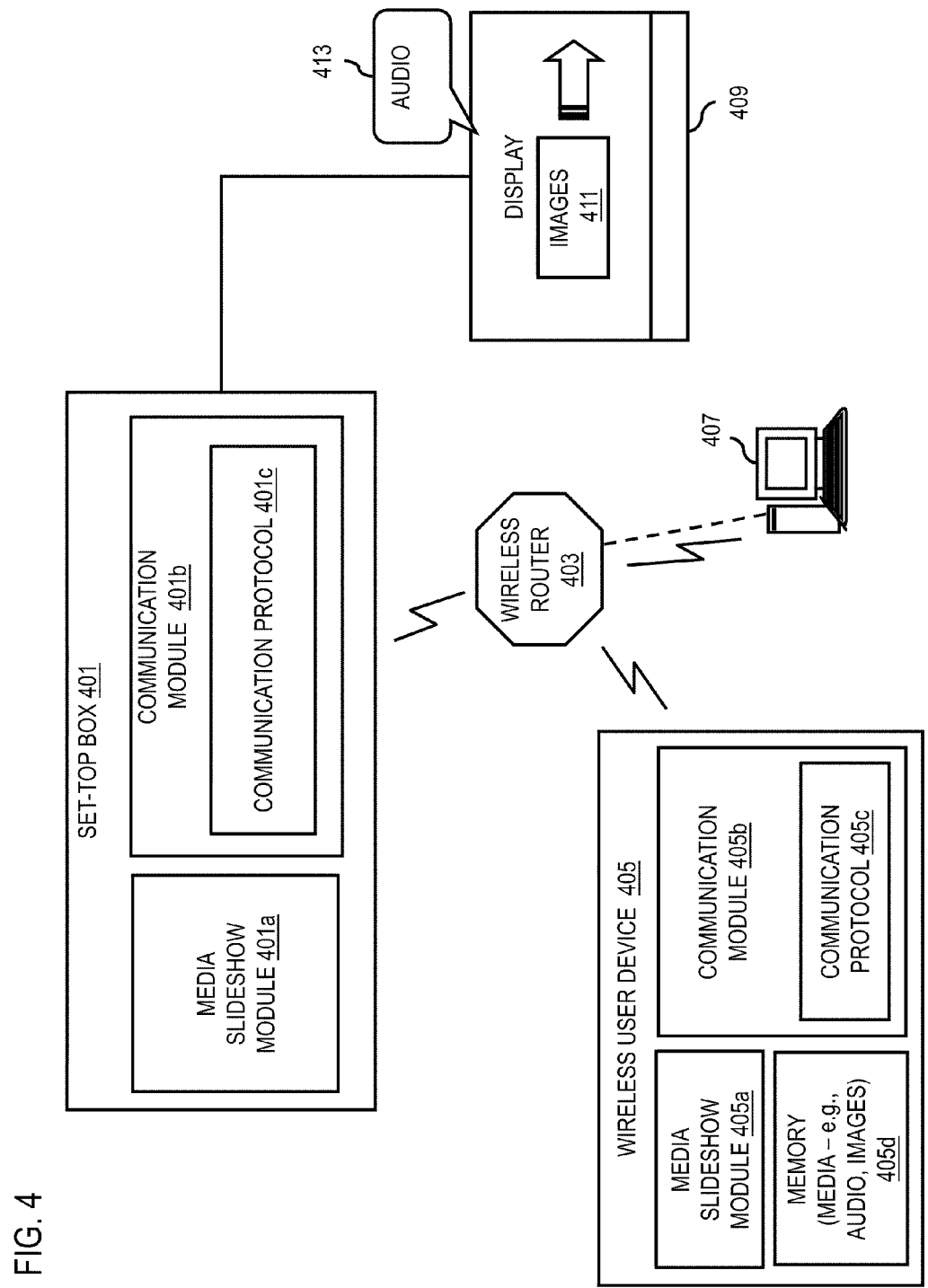
FIG. 4 is a diagram of a wireless environment in which a user device and a set-top box interact to provide media presentation utilizing media from the user device, according to an exemplary embodiment.

FIG. 4 is a diagram of a wireless environment in which a user device and a set-top box interact to provide media presentation utilizing media from the user device, according to an exemplary embodiment In this example, STB 401 operates within a wireless local area network (LAN) through the use of a wireless router 403, using Wi-Fi. The router 403 provides connectivity among a wireless user device 405 (e.g., mobile phone with Wi-Fi capability, PDA, etc.) and a computer device 407.

This arrangement can enable use of a mobile phone, for example, as a remote control device for the computer 407 and set-top box 401. Such an environment can support devices that are Wi-Fi enabled; alternatively, wired connections can be utilized—e.g., an Ethernet cable from computer device 407 to router 403, either directly or through another network component such as a hub.

STB 401 includes a media slideshow module 401a configured to operate with a communication module 401b to permit wireless user device 405 and computer device 407 to initiate a slideshow to be presented by STB 401 onto display 409. Media slideshow module 401a, among other functions, is responsible for "listening" to incoming requests devices 405, 407, and to determine whether devices 405, 407 are authorized to initiate the slideshow. The authorization procedure is more fully described with respect to FIGS. 9A and 9D.

Additionally, user device 405 includes a media slideshow module 405a, communication module 405b, and memory 405d configured to store media, such as images and audio files. In one embodiment, media slideshow module 405a provide features to obtain a list of available picture albums and music files available in the computer device 407. This media slideshow module 405a enables the mobile user a capability to select the picture album for the slideshow as well as a capability to select the music file to be played during slideshow. Furthermore, media slideshow module 405a can present the user with an option to select the photos within the mobile device 405 for the slideshow, along with the accompanying music.

Although not show, computer device 407 also includes a media slideshow module that is configured to interpret and execute commands from user device 405 relating to the slideshow.

In certain embodiments, the media of the user device 405 or computer device 407 can be made part of the slideshow, which can include images and one or more audio files. By way of example, two approaches are provided to cause the slideshow presentation via STB 401. First, user device 405 can send a command to computer 407 to instruct the computer 407 to transfer media stored within computer 407 to be played by STB 401. Second, user device 405 can directly communicate with STB 101 to transfer media stored in user device 405 for presentation via STB 401.

To transfer the media, user device 405 and STB 401 employ communication protocol 405c and 401c, respectively, to create a communication channel for transport of data messages as well as command (or control) messages. As more fully described below, the communication protocol can utilize transport protocols, such as Transmission Control Protocol (TCP) or User Datagram Protocol (UDP) over Internet Protocol (IP). As shown, upon completion of the transfer, the media can be presented by STB 401 to display 409 in form of images 411 that are periodically refreshed in a predetermined or randomized sequence. Moreover, the media can include audio files that are played as audio signals 413, while the images 411 are displayed; such audio playback can be according to a playlist specified by a user.

Figure 5:
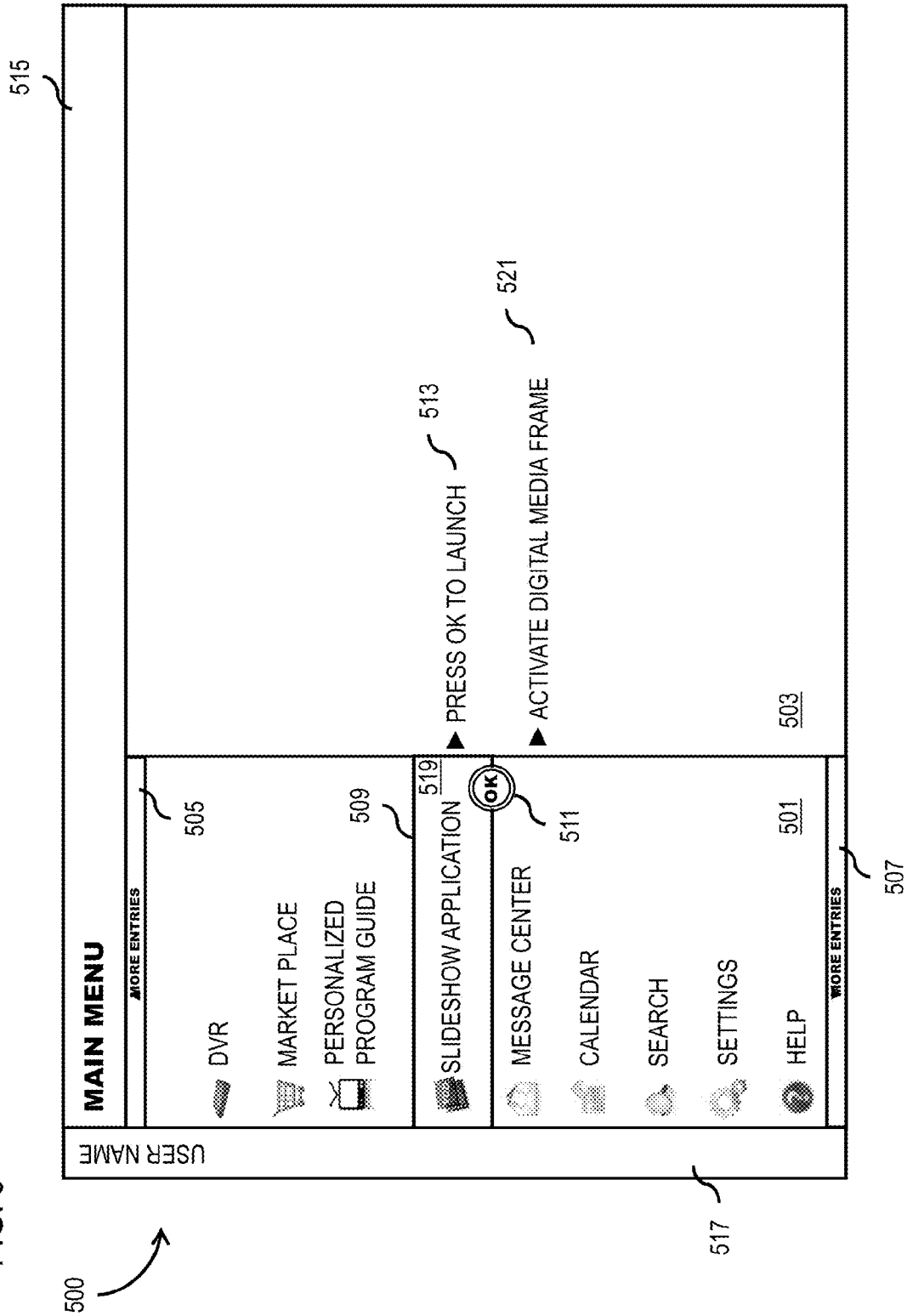
FIG. 5 is a diagram of a graphical user interface (GUI) presented by a set-top box to provide media presentation, according to an exemplary embodiment.

FIG. 5 is a diagram of a graphical user interface (GUI) presented by a set-top box to provide media presentation, according to an exemplary embodiment. Referring to the system of FIG. 3, a menu screen 500, which supported by STB 301, may be evoked using a number of different methods. For example, a user may select a dedicated "MENU" button on control device 309 or a peripheral device communicatively coupled thereto (e.g., PC 311, user device 303 (e.g., a mobile handset), etc.). It is recognized that any other suitable actuator of these devices may be additionally, or alternatively, used to access the functionality of menu 500, such as triggering a "MENU" icon. Further, menu 500 may be evoked by selecting an option within another interface or application (e.g., when navigating from a public screen to a user-specific screen, i.e., a private screen). As such, an executing device (e.g., STB 301, PC 311, etc.) may require sufficient authentication information (e.g., username and password, etc.) to be input in order to access the functions of main menu 500.

As shown, interface (or screen) 500, providing a "Main Menu," may include one or more interactive viewing panes, such as panes 501 and 503. In particular embodiments, the content of pane 503 may be dynamically updated to display various information related to actions conducted within pane 501, and vice versa. Pane 501 includes a listing of selectable entries corresponding to one or more features (or options) that may be provided via STB 201. For example, entries can include: program guide functions, DVR options, marketplace (shopping) options, on-demand programming options (e.g., browsing or searching on-demand programming), messaging and communications features, searching options, settings, help features, and the like. In certain embodiments, graphical elements may be provided to correspond to one or more of the entries, and may be displayed therewith.

Header 505 and footer 507 fields may be provided and configured to indicate the existence of additional entries not displayed, but navigably available. Accordingly, users may browse through these entries via, for instance, control device 309. A fixed focus state (e.g., border 509) and/or distinctive magnification features, e.g., color, brightness, bolding, font type, text size, etc., may be used to convey a "currently" navigated position. In this manner, when a user navigates to a desired entry, actuation of, for instance, an "OK" button on control device 309 may launch corresponding features and/or applications of the particular entry. In some embodiments, an interactive "OK" option 511 may be utilized. Moreover, main menu 500 may include tool tips (e.g., "PRESS OK TO LAUNCH" 513) when a user navigates to a particular entry. In other embodiments, an aural description of the entry navigated to and methods of interaction may be provided.

In other embodiments, main menu 500 may provide navigation fields 515 and 517 to facilitate usability. For example, field 515 may provide the name of the function/option being accessed, e.g., "MAIN MENU." In this manner, when a user accesses a new function/option, field 515 is automatically updated. Field 517 may be utilized to indicate the user profile currently authenticated to system 100, e.g., "USER NAME." Thus, a user may invoke a slideshow application by navigating to and selecting entry 519 of main menu 500. The launching of this application can initiate detection of surrounding user devices. According to one embodiment, the user can activate the digital media frame mode with prompt 521; upon this selection, the slideshow can cycle through according to the parameters set for the digital media frame. Exemplary parameters can include sources of the media, duration of the presentation of each of the media, one or more triggering events, etc.

Alternatively, and more typically, a user device can initiate the slideshow, as next explained.

Figure 6B:
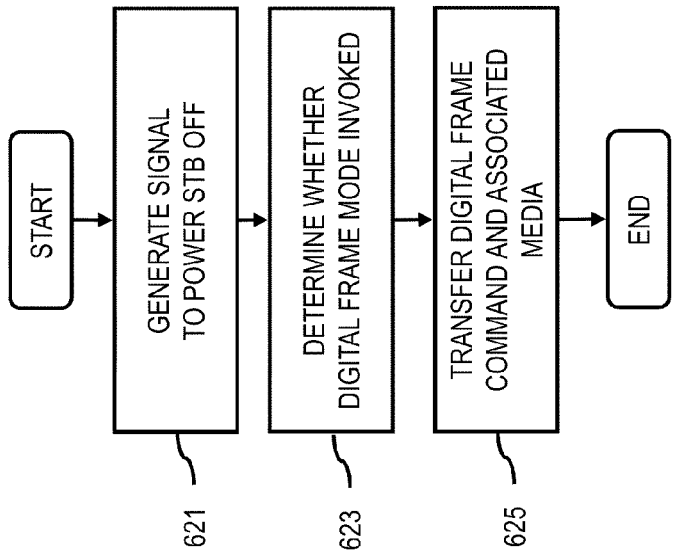
FIGS. 6A and 6B are, respectively, a flowchart of a process for initiating a slideshow by a user device, and a flowchart for a process for providing a digital frame, according to various embodiments.
Figure 6A:
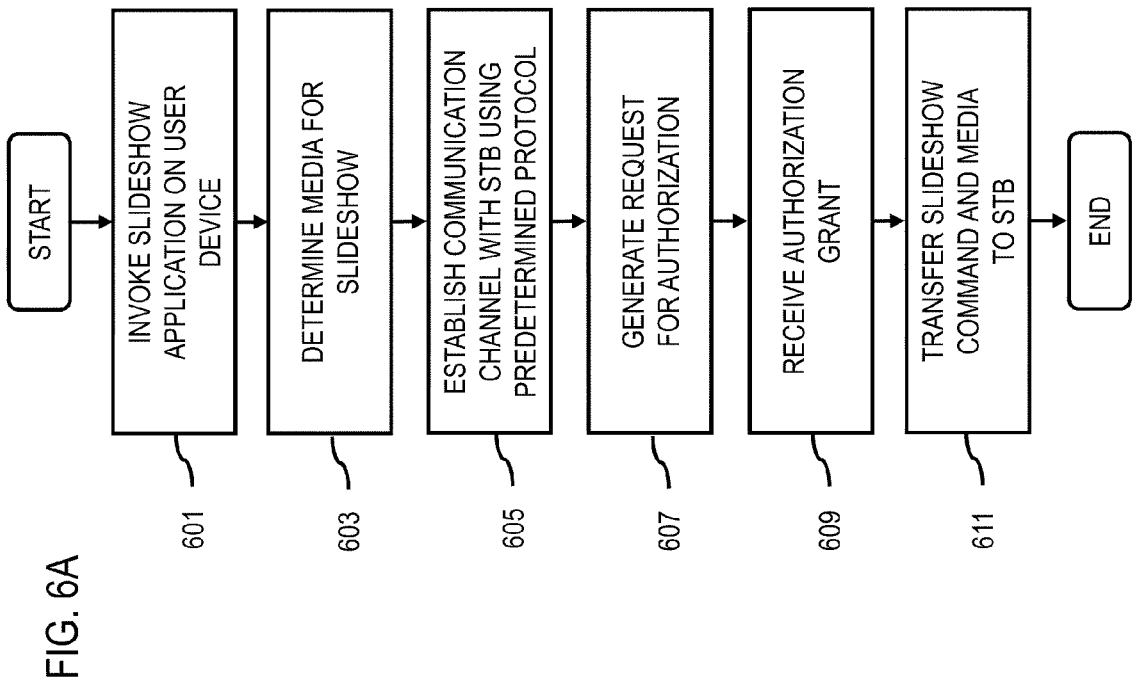

FIGS. 6A and 6B are, respectively, a flowchart of a process for initiating a slideshow by a user device, and a flowchart for a process for providing a digital frame, according to various embodiments. For the purposes of explanation, this process is executed by a user device and is described with respect to the system of FIG. 4 in which STB 401 and user devices 405 and 407 are configured to communicate using Wi-Fi. As seen in FIG. 6A, in step 601, a slideshow application on user device 405 is invoked. At this point, the particular media are determined for the slideshow (step 603). In one embodiment, the media include a series of images and/or audio files. For instance, assuming the user device 405 is a mobile phone that is equipped with a camera (not shown) and audio player (not shown) (such configuration is common place), the generation of these images and downloading of audio files are easily executed by a user. With the prevalence of sophisticated cameras and convenience of online media sharing and downloads, the user can readily amass media that are highly customized, and thus, desirable from the user's perspective. Therefore, it is recognized that a mechanism that facilitates the integration and presentation of the media with other media sources, e.g., television, promotes the adoption of both the television medium and the mobile phone as enablers for enhance user experience.

Next, in step 605, user device 405 can establish a communication channel with STB 401 using a predetermined protocol. Also, a request is generated to seek authorization for user device 405 to engage STB 401 for the purposes of the slideshow application, per step 607. In step 609, an authorization grant is received from STB 401, which verifies whether the particular user (or user device) using, for example, a user identifier and passcode. This authentication procedure is further detailed with respect to FIG. 9D.

Once the user (or user device 405) is authorized, user device 405 can transfer, as in step 611, a command along with the determined media to STB 401 for presentation to display 409.

The above process of presenting media can, in certain embodiments, be executed in under the digital media frame mode, as next described.

By way of example, the digital media frame mode of operations can be triggered by a number of events/activities of the STB 401. In the example of FIG. 6B, the triggering event can be a user turning off the STB 401. In step 621, user device 303 or control device 309 generates a control signal for transmission to the STB 301 to power off. At this point, the process determines whether a digital media frame mode is activated (as a background application), as in step 623. If the digital media frame mode has been activated, the process detects the signal to power down and uses this as a triggering event to present media that loops until further actions are taken. Towards this end, user device 303 generates a digital frame control command to invoke this digital frame feature on STB 401. In one embodiment, user device 303 can transfer any media resident on the device 303 to be shown in this "digital frame." Alternatively, STB 401 can present a slideshow utilizing media already stored on STB 401, media from user device 303, or a combination thereof.

Figure 7:
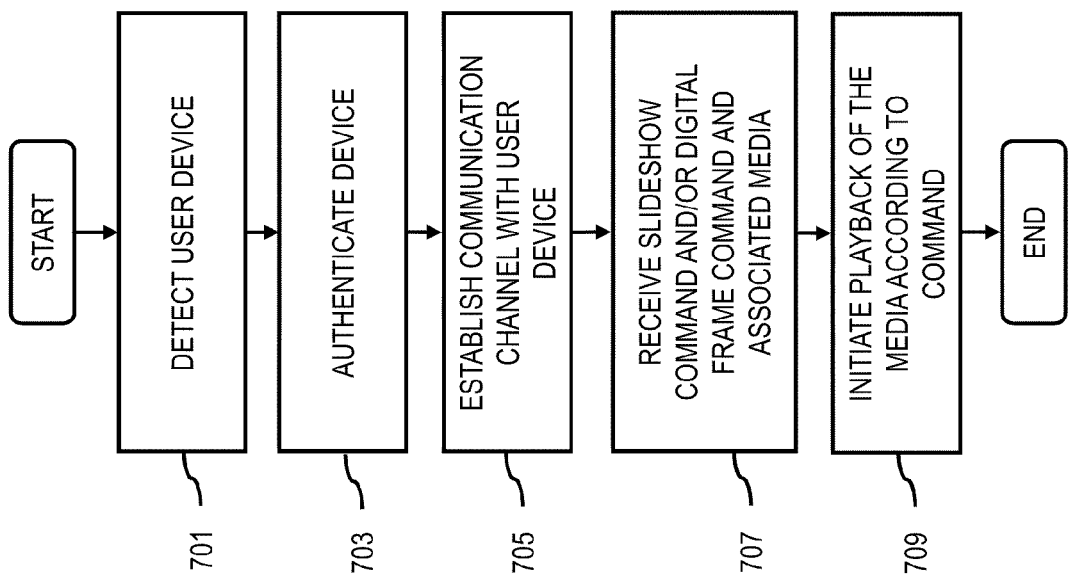
FIG. 7 is a flowchart of a process for presenting media on a set-top box initiated by a user device, according to an exemplary embodiment.

FIG. 7 is a flowchart of a process for presenting media on a set-top box initiated by a user device, according to an exemplary embodiment. From the perspective of STB 401, it first detects presence of user device 405, per step 701. Thereafter, an authentication process is performed, as in step 703, to verify that user device 405 (and/or user) is authorized. In step 705, a communication channel is established with user device 405 to support the transfer of commands and media resident on user device 405. Alternatively, the command can instruct STB 401 to acquire the media from another source, such as computer device 407.

After obtaining the media and an associated command (e.g., slideshow command and/or digital frame command), in step 707, STB 401 can initiate playback of the media according to the command, per step 709. In one embodiment, the command message can specify the necessary parameters pertaining to the playback of the media, which in this case are the images and one or more audio files. For example, these parameters can include order of the images as well as order of the audio files. Also, in certain embodiments, the slideshow application (or module) can be configured to provide a variety of image effects to process the images—the command can specify such effects.

The above processes of FIGS. 6 and 7 involve the interaction among STB 401 and user devices 405 and 407 using a predetermined protocol that is optimized for the exchange of information in the context of slideshow presentation. According to certain embodiments, the protocol is termed Simple and Extensible Transmission Protocol (SETP), as next detailed.

Figure 8A:
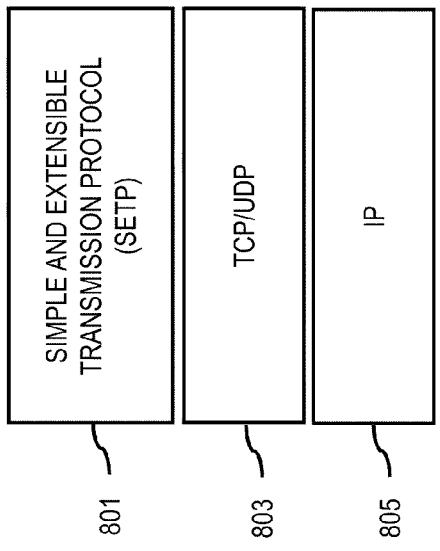
FIGS. 8A and 8B are diagrams of a communication protocol and associated messaging formats for supporting a slideshow application, according to various embodiments.
Figure 8B:
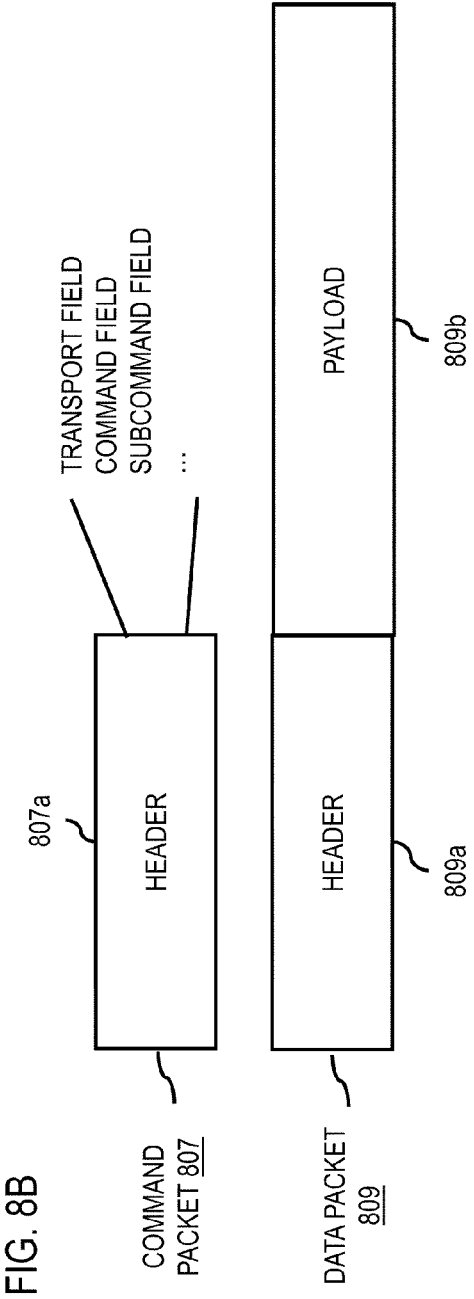

FIGS. 8A and 8B are diagrams of a communication protocol and associated messaging formats for supporting a slideshow application, according to various embodiments. As shown in FIG. 8A, in certain embodiments, a Simple and Extensible Transmission Protocol (SETP) 801 rests above a Transmission Control Protocol (TCP) or User Datagram Protocol (UDP) layer 803. Also, the Internet Protocol (IP) 805 can be utilized. These protocols 801-805 can configured to operate in a variety of wireless transport environments. For the purposes of illustration, the SETP 801 is explained with respect to a Wi-Fi environment.

In one embodiment, SETP 801 is a binary protocol that resides within the application layer (of the Open System Interconnect (OSI) model). SETP 801 can be used to send various commands and command related information along with command data. SETP 801 utilizes predefined command headers, thereby advantageously requiring less processing time. Also, this protocol is efficient as the commands are pre defined and the decoding can be simple. Further, SETP 801 is fast, in that the processing of the commands follow different logical branches for different commands.

As mentioned, SETP 801 can be configured to support different transport mechanisms. For instance, the addition of new transport mechanisms and associated commands can be readily accommodated. The commands and data to be transferred are secure in that SETP 801 is session based. Accordingly, passwords are never "sent out through wire"; consequently, the password need not be changed frequently.

SETP 801 can be used to build different applications. Although SETP 801 is primarily described herein for the communication between STBs and user devices, SETP 801 can also be used to communicate between any other applications/devices/PCs to transfer commands and data.

As depicted in FIG. 8B, a command message (or referred to as command packet in the case of IP) 807 includes only a header. A data message (data packet) includes a header 809a and a payload 809b.

The SETP header structure 809a includes 70 bytes. This header is used to carry all the commands, data and events. Table 1 below enumerates the fields in the header, according to certain embodiments.

TABLE 1

Protocol ID (1 Unsigned Byte)
Protocol Version (1 Unsigned Byte)
Protocol Subversion (1 Unsigned Byte)
Transport (1 Unsigned Byte)
Command (2 Unsigned Bytes)
Command Sequence (1 Unsigned Byte)
Time stamp (4 Unsigned Byte)
Proxy Info (6 Unsigned Byte)
From Info (6 Unsigned Byte)
To Info (6 Unsigned Byte)
Auth Info (32 Unsigned Byte)
Sub Command (1 Unsigned Byte)
Flags (2 Unsigned Bytes)
Reserved (2 Unsigned Byte)
Payload Length (4 Unsigned Byte)

The Protocol Identifier (ID) field identifies the particular message or packet. For example, the Protocol Identifier can be defined as 'V' such that all packets associated with this protocol should have the ID as 'V'. Also, a Protocol Version field can be provided to denote the major version of the protocol. This major version can be changed either for a major functionality change or if the protocol subversion reaches a predetermined limit. The Protocol Subversion field specifies the sub version of the protocol. For every new addition, alteration and modification of this draft requires either this field's increment or the version field's increment.

Transport field denotes the transport mechanism used by the protocol to communicate with other devices, as SETP is designed to accommodate different transports; e.g., TCP over Wi-Fi, and the UDP over the Wi-Fi (the values are specified in Table 2):

TABLE 2

SETP_TRANSPORT_WIFITCP = 1
SETP_TRANSPORT_WIFIUDP = 2

A Command field identifies the command carried by the protocol. Also, a Command Sequence field denotes the sequence number of the packet sent. For instance, the sequence can start from 0 to 255. Once the value reaches 255, the sequence of the next packet will be 1. By way of example, the sequence number is zero for new commands. This sequence increases if a command/data packet sends its continuation packet.

A Time Stamp field specifies the timestamp of the packet generated. This field can be based on GMT (Greenwich Mean Time) time zone. In one embodiment, for the continuation packets, the timestamp can be the same as the initial packet. The Time Stamp field can be used to combine the divided data packets of the same command.

A Proxy Info field specifies the IP address of the proxy. For the protocol supported in this version, this field is set as the IP address of the endpoint device. This field is particularly useful when TCP and UDP are employed.

A From Info field has the IP address of the packet originator. Also, a To Info field is provided to specify the information of the destination.

An Auth Info field indicates the Session ID established through the initial hand shaking.

A Sub Command field is provide to specify any additional information about the command. The values of this Sub Command field can be interpreted differently for different commands.

SEPT 801 also provides fields for flags, which can include two bytes to be used to specify the bit level information about the packet. The defined bit values are given below in Table 3:

TABLE 3

| Bit Position (From most significant bit) | Description if set |
| --- | --- |
| 1 | Denotes Originator |
| 2 | It has the continuing packets |
| 3 | It is the continuing packet |
| 4 | If this command is the proprietary |
| 5 | If this device starts the TCP channel first |
| 6 | Denotes big endian |

A Reserved field is provided for future development.

A Payload Length field indicates the length of the payload of the command packet. If this field is zero, for instance, the packet is recognized as a command packet 807. If this field is not zero and carries some information, this packet is recognized as a data packet 809. If stream oriented protocols are used as the transport, the next immediate length bytes are read and appended as the payload of this packet. There need not be any constraint on format or the manner in which the payload is manipulated and handled. However, the payload data can be specified in the name, length and value pair, for example. In this manner, SETP 801 can accommodate different proprietary headers and different objects at the same time.

Regarding command packets and data packets (shown in FIG. 8B), as mentioned, packets that have only headers are defined as command packets. If the packet has both the header and payload data, these packets are designated as data packets. According to some embodiments, the payload of the data packets follow the NLV (Name, Length and Value order) structure. Table 4 lists exemplary header names and codes:

TABLE 4

| Name value (1 unsigned byte) | Description |
| --- | --- |
| 0 | End indicator |
| 1 | Contains "Name" |
| 2 | Type |
| 3 | Content or data |
| 4 | Algorithm |
| 5 | Nonce key |
| 6 | Key Limit |
| 7 | Key |
| 8 | IP |
| 9 | Port |
| 10 | Transport |
| 11 | Session support |
| 12 | Transport Support |
| 13 | Media Support |
| 14 | Length Support |
| 15 | Session Init Time |
| 16 | Session Validity |
| 17 | Max payload support |
| 18 | Binary data model (Big/Little endian) |
| 19 | ID |
| 20 | Size |
| 21 | MAC |

Table 5 provides common subcommands in the responses:

TABLE 5

| Sub Command | Description |
| --- | --- |
| 1 | OK |
| 2 | NOT_AUTHORIZED |
| 3 | NOT_AUTHENTICATED |
| 4 | FILETYPE_NOT_SUPPORTED |
| 5 | VERSION_NOT_SUPPORTED |
| 6 | TRANSPORT_NOT_SUPPORTED |
| 7 | GENERAL_ERROR |
| 8 | ERROR_PROCESSING_REQUEST |
| 9 | COMMAND_NOT_SUPPORTED |
| 10 | SUBCOMMAND_NOT_SUPPORTED |
| 11 | NOT_AVAILABLE |
| 12 | INVALID_HEADER |
| 13 | INVALID_PAYLOAD |

By way of example, the commands that are supported by SETP 801 fall into two categories: (1) authenticated commands, and (2) unauthenticated commands. The authenticated commands are the commands can be used only after the authentication, while the unauthenticated commands can be used in both authenticated and unauthenticated sessions.

In addition, SETP 801 utilizes a Broadcast field to specify broadcasting commands: SETP_COMMAND_BROADCAST=1.

Regarding the payload 809b, a payload that is sent during the initial handshaking negotiation is denoted as "the resource capability payload." In certain embodiments, there are nine headers that are defined in this payload. These headers are followed in the name, length and value combination, as shown in Table 6.

TABLE 6

| Description | Name (1 Unsigned Byte) | Length (2 unsigned Bytes) | Value |
|---|---|---|---|
| Binary Data Model(1 - Little Endian 2 - Big Endian) | 18 | 1 | 2 |
| Algorithm (Any SHA family algorithms can be used) | 4 | 1 | 1 (denotes SHA-1) |
| Nonce value | 5 | 1 | 0 (use the time stamp from the command header) |
| Key Limit (To denote the range of keys sent from the keys generated) | 6 | 4 | First 2 bytes denotes "starts from". Second 2 bytes denotes "ends with". 0 for the first byte and 31 for the second byte |
| Key (It combines the "user id + password + nonce" and makes it as a single string. Then the SHA-1 algorithm will be applied to this header to get the 32 bit key. This key will be sent in this field.) | 7 | 32 | Holds the key generated |
| IP | 8 | 6 bytes | 0 (Means the IP will be taken from the IP packet's header) |
| Port | 9 | 2 | Port Number |
| Transport Preference | 10 | 1 | 1 (to denote the TCP over Wi-Fi preference for the communication) |
| Display Name | 1 | Length of the "display name" | Optional Display name (Ex, "SoftRemote") |

In SETP 801, an Init Session command is used for authorization, and specifies a payload according to the capabilities that are supported. This Init Session command requires a response, which in turn, requires an acknowledgement (INIT ACK). If the validation fails, the connection is closed. The values of the command are as follows in Table 7:

TABLE 7

SETP_COMMAND_INITREQUEST = 3
SETP_COMMAND_INITRESPONSE = 4

For example, in the INIT ACK, the command is '4' and the sub command is '1'. The payload is defined according to Table 8:

TABLE 8

| Description | Name (1 Unsigned Byte) | Length (2 unsigned Bytes) | Value |
|---|---|---|---|
| Binary Data Model | 18 | 1 | 2 |
| Display Name | 1 | Length of the name value | |
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |
| Session support | 11 | 4 | |
| Transport Support | 12 | 2 | |
| Media Support | 13 | 4 | |
| Length Support | 14 | 4 | |
| Session Init Time | 15 | 6 | |
| Session Validity | 16 | 4 | Validity time in sec. (Once this validation time is over, it can challenge the other end using the 'Authenticate request') |
| Max Payload Support | 17 | 4 | |

SETP 801 also defines an End Session command, which is used to close/stop the session (e.g., SETP_COMMAND_ENDREQUEST=5). The response is not mandatory for this command.

Further, a Cancel Transfer command is provided for aborting a file transfer. No subcommand or payload is needed. An example of such command is as follows: SETP_COMMAND_CANCELTRANSFERREQUEST=11.

A Channel Change Command relates to changing a channel. This command, according to one embodiment, as an associated response; an example is as follows: SETP_COMMAND_CHANNELCHANGEREQUEST=17. If the requested channel is not found, the response can indicate a sub command of '11'. An exemplary payload is provided below in Table 9:

TABLE 9

| Description | Name (1 Unsigned Byte) | Length (2 unsigned Bytes) | Value |
|---|---|---|---|
| Channel ID | 19 | 4 | |
| Channel Name | 1 | Length of Name | |

A File Display Command is supplied to send a file for display by the receiver. This command has an associated response, which indicates status of the file display. The payload, as detailed in Table 10, can be sent in multiple packets, whereby all the continuation packets only have the File content NLV. Such command is as follows: SETP_COMMAND_FILEDISPLAYREQUEST=19.

TABLE 10

| Description | Name | Length | Value |
|---|---|---|---|
| File Name | 1 | Length of the file name given in the value | Actual file name |
| File Type | 2 | 2 | File type in the bit representation |
| File Size | 20 | 4 | Total file size |
| File Content | 3 | Length of the content | Content of the file |

SETP 801 also provides a GTP Payload command, which is used to transfer the GTP content. In one embodiment, a response is mandatory for this command (e.g., SETP_COMMAND_GTPREQUEST=21). Table 11 enumerates the sub commands:

TABLE 11

ERROR = 0
CATG_REQ = 1
CATG_RES = 2
CH_REQ = 3
CH_RES = 4
PI_REQ = 5
PI_RES = 6
PD_REQ = 7
PD_RES = 8

A Search Command accommodates a generalized search; such command is as follows: SETP_COMMAND_SEARCHREQUEST=23. Table 12 shows the associated sub commands.

TABLE 12

SEARCH_START = 1
SEARCH_STOP = 2
SEARCH_KEYDATA = 3
SEARCH_DATA = 4
SEARCH_RESET = 5

To initiate a search, a 'search start' command is sent. Each and every key that is inputted is transmitted as key data. Also, a 'search stop' command specified to end the search. Table 13 provides an exemplary payload:

TABLE 13

| Description | Name | Length | Value |
|---|---|---|---|
| Data | 3 | Length of the data in case of 'data'. '1' in case of the 'key data'. | value to be searched. |

A General Response command is provided to alert the other device about some general predefined responses. No payload need be specified. This command (e.g., SETP_COMMAND_GENERALRESPONSE=25) can be sent as a response for any request. Table 14 lists the sub commands:

TABLE 14

OK = 1
NOT_AUTHORIZED = 2
NOT_AUTHENTICATED = 3
FILETYPE_NOT_SUPPORTED = 4
VERSION_NOT_SUPPORTED = 5
TRANSPORT_NOT_SUPPORTED = 6

TABLE 14-continued

GENERAL_ERROR = 7
ERROR_PROCESSING_REQUEST = 8
COMMAND_NOT_SUPPORTED = 9
SUBCOMMAND_NOT_SUPPORTED = 10
NOT_AVAILABLE = 11

An Authenticate Request command permits the other device to authenticate itself (for the nonce value provided by the device). This request has a response; if the response is not proper, the session is closed. The latest key generated will be used as the Session ID for the remaining session. The command and response are as follows:

TABLE 14

SETP_COMMAND_AUTHENTICATEREQUEST = 27
SETP_COMMAND_AUTHENTICATERESPONSE = 28

The payload is listed in Table 15:

TABLE 15

| Description | Name | Length | Value |
|---|---|---|---|
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |

A Remote Control Command is provided for sending the remote control keys to the receiving side. A response this type of command is not needed. An example of the Remote Control Command is SETP_COMMAND_REMOTECONTROLREQUEST=29. Table 16 shows the sub commands:

TABLE 16

RC_KEY_POWER = 0
RC_KEY_MUTE = 1
RC_DEVICEKEY_STB = 2
RC_DEVICEKEY_AUX = 3
RC_DEVICEKEY_DVD = 4
RC_DEVICEKEY_TV = 5
RC_KEY_MENU = 6
RC_KEY_GUIDE = 7
RC_KEY_INFO = 8
RC_CONTROL_UP = 9
RC_CONTROL_DOWN = 10
RC_CONTROL_LEFT = 11
RC_CONTROL_RIGHT = 12
RC_CONTROL_OK = 13
RC_KEY_EXIT = 14
RC_KEY_OPTIONS = 15
RC_KEY_WIDGETS = 16

TABLE 16-continued

```
RC_KEY_ONDEMAND = 16
RC_KEY_FAVOURITES = 17
RC_KEY_JUMP = 18
RC_KEY_FIOSTV = 19
RC_KEY_CHANNELUP = 20
RC_KEY_CHANNELDOWN = 21
RC_KEY_VOLUMEUP = 22
RC_KEY_VOLUMEDOWN = 23
RC_KEY_SKIPBACK = 24
RC_KEY_SKIPFORWARD = 25
RC_KEY_DVR = 26
RC_KEY_PLAY = 27
RC_KEY_STOP = 28
RC_KEY_PAUSE = 29
RC_KEY_FORWARD = 30
RC_KEY_BACKWARD = 31
RC_KEY_REC = 32
RC_KEY_1 = 33
RC_KEY_2 = 34
RC_KEY_3 = 35
RC_KEY_4 = 36
RC_KEY_5 = 37
RC_KEY_6 = 38
RC_KEY_7 = 39
RC_KEY_8 = 40
RC_KEY_9 = 41
RC_KEY_0 = 42
RC_KEY_ASTERISK = 43
RC_KEY_HASH = 44
RC_CONTROLKEY_A = 45
RC_CONTROLKEY_B = 46
RC_CONTROLKEY_C = 47
RC_CONTROLKEY_D = 48
RC_KEY_INPUT = 49
RC_KEY_PIP = 50
RC_KEY_PIPCHANGE = 51
```

SETP 801 further provides a SlideShow command. According to certain embodiments, this command specifies the beginning and ending of the slide show. Also, the command can notify the receiving device of slide show related events. An example of this command is as follows: SETP_COMMAND_SLIDESHOWREQUEST=31. Table 17 lists the associated sub commands:

TABLE 17

```
SLIDESHOW_START = 1
SLIDESHOW_STOP = 2
SLIDESHOW_PAUSE = 3
SLIDESHOW_RESUME = 4
```

A Device Info Request command permits the sending (or source) device a way to obtain device information of the receiving device (or destination).

Table 18 lists the commands:

TABLE 18

```
SETP_COMMAND_DEVICEINFOREQUEST = 33
SETP_COMMAND_DEVICEINFORESPONSE = 34
```

Table 19 lists the associated payload.

TABLE 19

| Description | Name | Length | Value |
|---|---|---|---|
| Display Name | 1 | Length of the Name | |
| Mac Address | 21 | 6 | |

Alternatively, a digital media frame mode of operation can be invoked using a digital frame control command. That is, this command is used to send the digital frame related commands. In one embodiment, a File Display command can be used to transmit the files in digital frame control mode:

SETP_COMMAND_DIGITALFRAMECONTROL=301.

Table 20 lists the associated subcommands.

TABLE 20

| COMMAND | DESCRIPTION |
|---|---|
| DIGITALFRAMECONTROL_INIT = 1 | This command notifies the other end about the digital frame mode transaction. After this command, all the files that are interested will be communicated using any of the file transfer command that has the indication of file type(For ex, File Display). |
| DIGITALFRAMECONTROL_START = 2 | This command notifies the other end to go to the "Digital Frame Mode". This command can be sent once the transmission of all the media files are done successfully. This digital frame mode will be stopped either by the stop command or by any of the user actions performed on the device that is in digital frame mode. |
| DIGITALFRAMECONTROL_STOP = 3 | Cease digital frame mode. |

With respect to the payload, Table 21 enumerates the exemplary fields.

TABLE 21

| Description | Name | Length | Value |
|---|---|---|---|
| Digital Frame Mode | 49 | 1 | This value denotes the type of media involved that needs to be displayed on the device which is in the "Digital Frame Mode". 1 - SINGLE_IMAGE 2 - SINGLE_IMAGE_WITH_MUSIC 3 - MULTIPLE_IMAGES 4 - MULTIPLE_IMAGES_WITH_MUSIC 5 - SINGLE_VIDEO 6 - MULTIPLE_VIDEOS 7 - IMAGE_AND_VIDEO |
| Total No of files Involved | 22 | 2 | Binary value represents the number of files involved in this mode |

FIGS. 9A-9D are flowcharts of processes for establishing communication between a user device and a set-top box, according to various embodiments. By way of example, these processes associated with SETP 801 are explained with respect to the system of FIG. 4, wherein communication is established between a user device 405, 407 and set-top box 401.

Figure 9A:
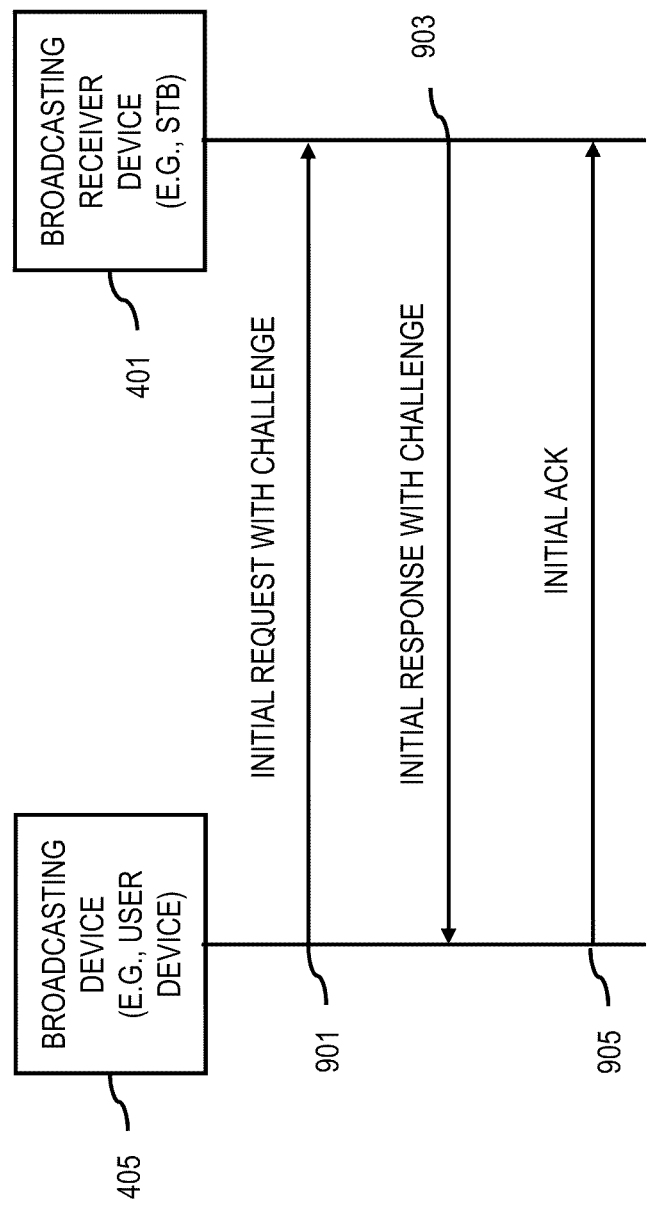

FIG. 9A shows a ladder diagram of a handshaking mechanism that is supported by SETP 801. In this example, user device 405 and STB 401 are assigned a User ID and password (or passcode); the assignment of these credentials can be managed by a service provider according to one embodiment. Under this scenario, the devices 401, 405 can communicate if both of their credentials are same. In this manner, it would be apparent that the user is common to user device 405 and STB 401. According to certain embodiments, a key is generated from the User ID and password (e.g., a personal identification number (PIN)) will be sent as part of broadcast packets.

Under this arrangement, there is flexibility for interested devices to establish a communication channel with the broadcasting device.

As shown, user device 405 is referred to as a "broadcasting device," while STB 401 is the "broadcasting receiver device." For instance, when the broadcast receiver 401 decides to communicate with the broadcasting device 405, the receiver 401 establishes a communication channel (e.g., TCP session or channel) with the broadcasting device 405. If the connection is not authenticated using, for example, an initial hand shaking within a predetermined period (e.g., 120 seconds) of the connection being opened, the connection is closed. When the connection is accepted by device 405, device 405 challenges with the initial hand shaking request. Thus, in step 901, user device 405 generates a request with challenge for transmission to STB 401. In turn, the broadcasting receiver device 401 can submit a response along with the challenge, per step 903. Upon receiving the response, device 405 can send an acknowledgement message (ACK) to positively indicate successful receipt of the response (step 905). Once this procedure is completed, the session is secured. The challenge response can be used as the Session ID for the entire session.

In one embodiment, the common (or least) capabilities transmitted during the above hand shaking negotiation process can be used as the session capability for the whole session. If the session capability rules are violated by any command, such rules can be responded with a "Not Supported" response.

According to certain embodiments, all the further communications between device 401 and device 405 will be conducted over this TCP channel in the case of TCP transport. If the TCP connection is broken, the described authentication procedure is performed again for the new communication channel. That is, on successful handshake, both the originator and terminator devices can maintain the TCP channel for the whole session. This TCP channel can be closed and opened at any point of time during the communication. Each re-opening of communication channel requires the described handshaking mechanism to be performed for the authentication. The command and data packets (which were described above) can be sent through this established channel. The connection will be closed if the authentication or authorization fails. Also, an established communication channel can be closed by sending a session close command; however, closing the TCP channel can also terminate this session.

FIG. 9B shows a process for detecting a user device, according to one embodiment. In step 911, user device 405 generates a message, e.g., UDP broadcast message, for transmission to STB 401. SETP 801, in certain embodiments, provides for binding and listening on predetermined port for both the TCP and UDP packets. The device that does not want to be detected need not start a UDP server. Similarly in the case in which a device does not want to support the detection mechanism (and only wants to be an originator all the time), such device also need not start the TCP server. If a device wants to support the detection mechanism (and only wants to be the terminator), the particular device need not start the TCP server, but needs to start the UDP server.

The terminator (STB 401 in this example) can listen on the same port for both the TCP and UDP packets. When an originating device wants to detect other SETP responders, such device generates the UDP broadcasting packets. Upon detection of this broadcast message, STB 401 initiates establishment of a TCP connection (per step 913), using the handshaking procedure of FIG. 9A (as in steps 915-910). Hence, by receiving this broadcasting packet, the receiving device 401 (terminator) can establish a TCP communication channel with device 405.

In this example, user device 405 submits an End Request message to STB 401, per step 921. Also, user device 405 sends an End Response message, as in step 923, to STB 401.

Figure 9C:
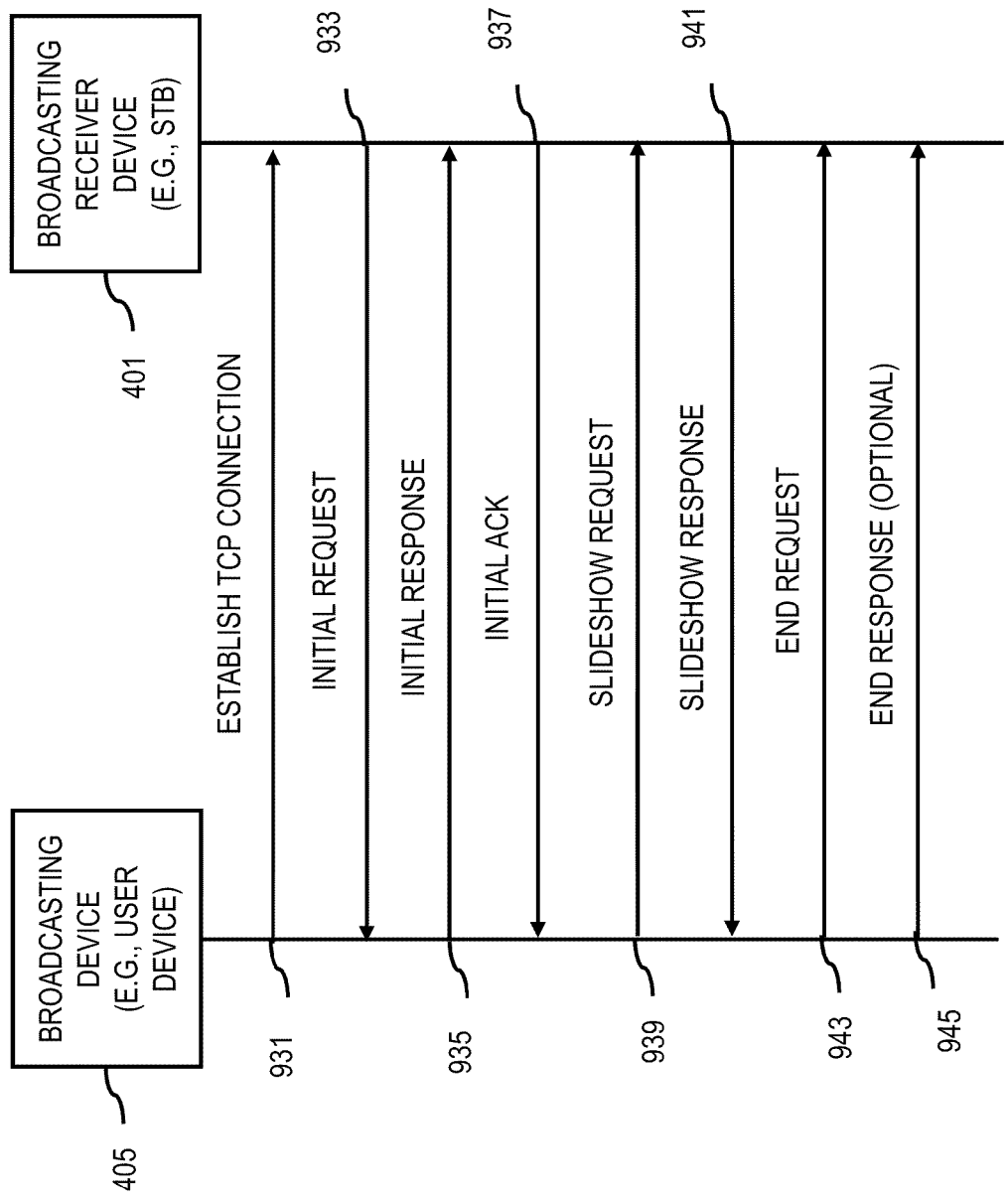

FIG. 9C depicts a process for sending commands using SETP 801, according to one embodiment. For the purposes of illustration, the command relates to presentation of a slideshow by STB 401. As with the process of FIG. 9B, a communication channel (e.g., TCP connection) is established using the handshaking mechanism of FIG. 9A, per steps 931-937. Thereafter, user device 405, as in step 939, generates and sends a slideshow request to STB 401, which replies with a slideshow response (step 941). This exchange can involve parameters for starting, stopping, pausing, and/or resuming the media presentation via STB 401. In steps 943 and 945, user device 405 submits an end request and an optional end response to terminate the session.

Figure 9D:
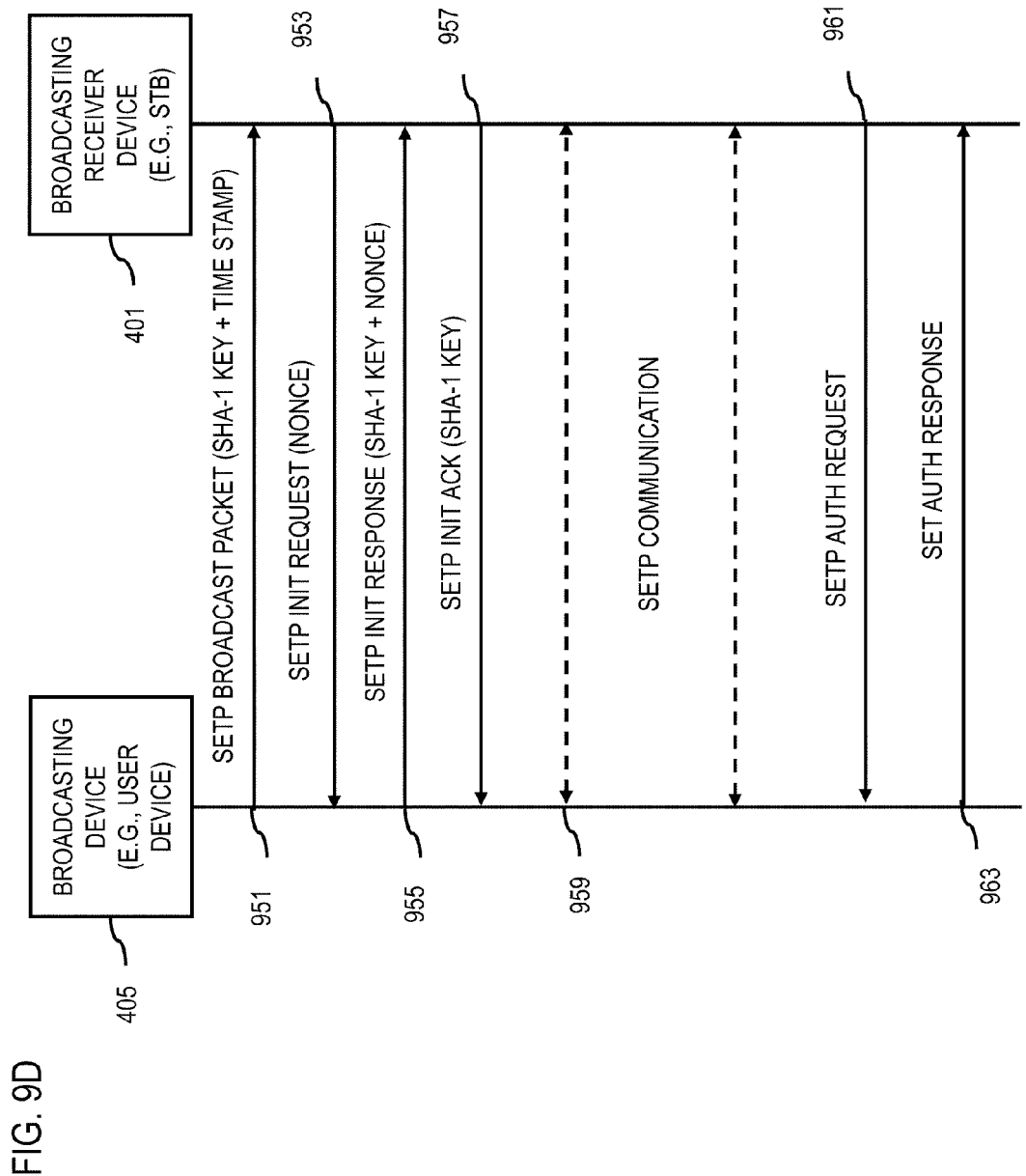

FIG. 9D illustrates a signaling flow for authenticating a user device using SETP 801, according to one embodiment. This example addresses how SETP 801 ensures session security and data security. In certain embodiments, the SHA family of algorithms (SHA-1) is employed by SETP 801 for the encryption. As seen, an initial "SETP BROADCAST" packet is sent, per step 951, by user device 405. The BROADCAST packet carries a SHA-1 key and a nonce value as its payload. The SHA-1 key is generated using the combination of the User ID, password and the nonce value (time stamp generated during the packet generation). For example, if the User ID is "51234567890", the password is "ABCD" and the time stamp is "987654321", the combined string "51234567890ABCD987654321" is formed. The resultant string is used as an input to generate the SHA-1 key.

The terminating device, STB 401, receives this BROADCAST packet and extracts the SHA key and the nonce value. Since STB 401 also is aware of the User ID and password, STB 401 generates the SHA key using the nonce value (extracted from the BROADCAST packet) sent by the originator. If the resultant SHA key generated by the terminator is the same as the one received from the originator 405, a TCP communication channel can be established with originator, user device 405.

In step 953, STB 401 accepts the TCP connection, and challenges user device 405 with the SETP INIT REQUEST. This request, for example, includes a nonce value as a payload. Once device 405 receives this INIT REQUEST, device 405 generates the SHA key using the User ID, password and the nonce value (received from the terminator 401). User device 405 challenges STB 401 with a nonce value and with the SHA key through the SETP INIT RESPONSE, per step 955.

When STB 401 receives this INIT RESPONSE, STB 401 extracts the nonce value and the SHA from the INIT RESPONSE. STB 401 then responds to the challenge by generating the SHA key and sends the key through the SETP INIT ACK, per step 957.

As both STB 401 and user device 405 successfully responded to the challenges, now they are paired and can communicate. According to one embodiment, to ensure the communication channel is secure, set-top box 405 can periodically challenge user device 405 through a SETP AUTH REQUEST and appropriate SET AUTH RESPONSE (steps 961 and 963). If any of the entity fails to respond the challenges successfully, the communication channel will be closed.

The described processes and arrangement advantageously enables users to conveniently initiate presentation of media that is resident within their user devices (e.g., mobile phone, PC, etc.) to a set-top box. In certain embodiments, the communication between the user device and STB is facilitated by a simple and extensible transmission protocol.

The processes described herein for providing a media slideshow via a set-top box may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
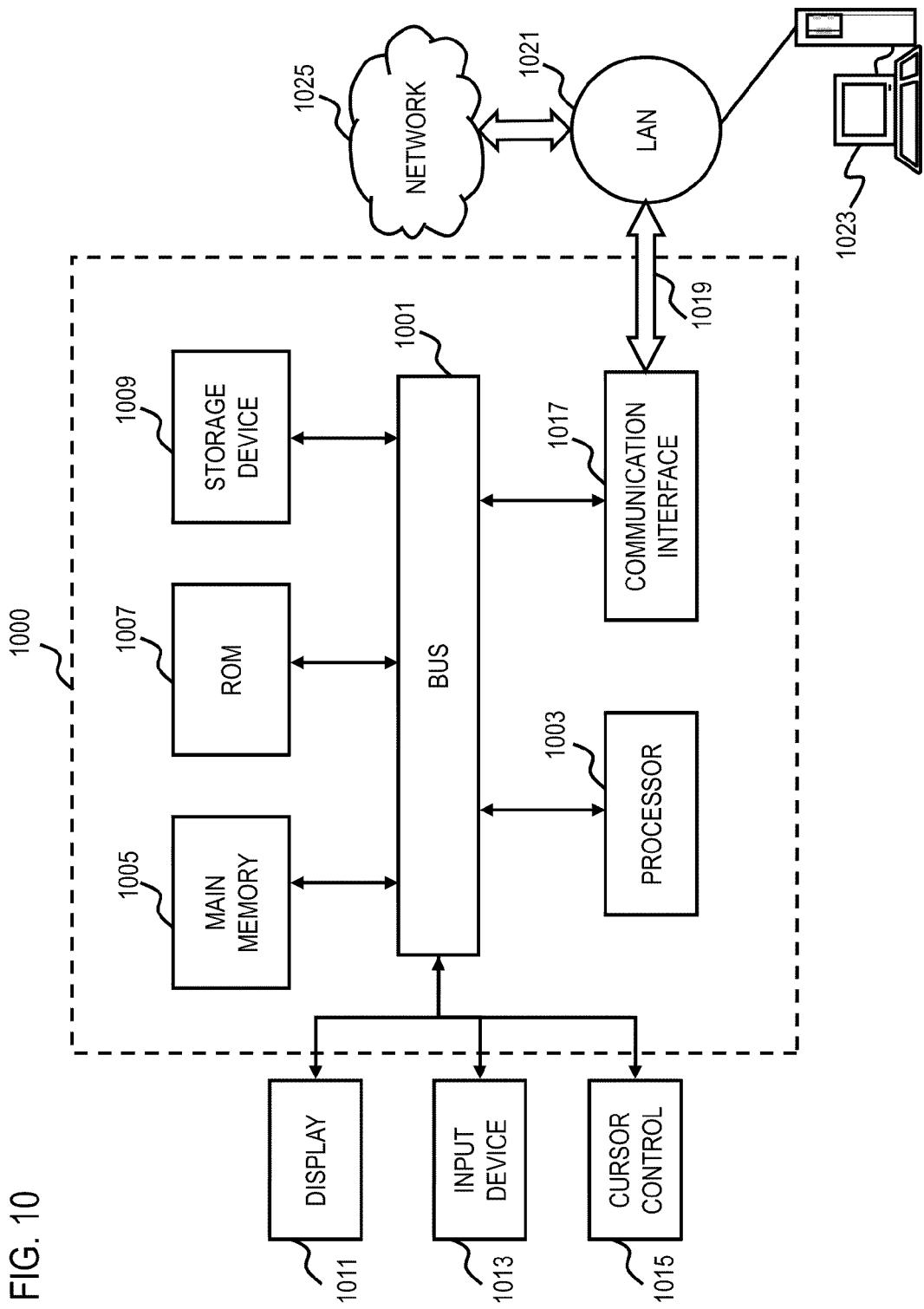
FIG. 10 is a diagram of a computer system that can be used to implement various exemplary embodiments.

FIG. 10 illustrates computing hardware (e.g., computer system) upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as random access memory (RAM) or other dynamic storage device, coupled to the bus 1001 for storing information and instructions to be executed by the processor 1003. Main memory 1005 also can be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
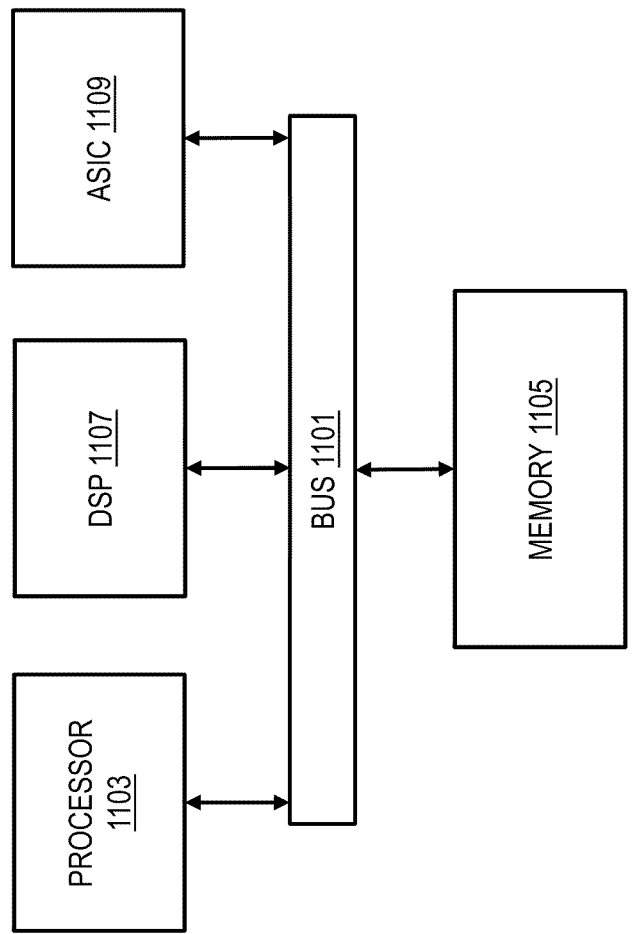
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 2, 6, 7, and 9A-9D.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    detecting, at a set-top box, a wireless device according to a predetermined communication protocol, wherein the set-top box has a slideshow application;
    establishing a communication channel with the wireless device according to the communication protocol;
    receiving, according to the communication protocol, a command message from the wireless device over the communication channel, wherein the command message specifies playback of a media resident on the wireless device via the set-top box;
    receiving the media resident on the wireless device from the wireless device, over the communication channel; and
    providing a slideshow at the set-top box based on the received media after receiving all media resident on the wireless device designated for the slideshow,
    wherein the set-top box is directly connected to the Internet,
    wherein the command message specifies the beginning and ending of the slideshow, and
    wherein a user is common to both the wireless device and the set-top box.

2. A method according to claim 1, further comprising:
    activating a digital frame mode of operation for the presentation of the slideshow,
    wherein in the digital frame mode, the slideshow continues to repeat with the media presented in sequence in which they are originally presented for the slideshow.

3. A method according to claim 1, wherein the media is transported over the communication channel in one or more data messages, and includes a plurality of images, one or more audio files, one or more video files, or a combination thereof.

4. A method according to claim 1, wherein the communication protocol specifies a predefined header of a fixed length, and the command message includes only the predefined header to indicate that the type of message is a command message.

5. A method according to claim 4, wherein the predefined header includes,
    a transport field specifying transport mechanism used for the communication channel,
    a command field identifying a command message;
    a subcommand field specifying information about the command message; and
    a payload length field specifying a length of a payload of a command packet,
    wherein a packet is recognized as a command packet when the payload length field is zero.

6. A method according to claim 1, further comprising:
    receiving a broadcast message as part of the detection of the wireless device, wherein the broadcast message includes a unique key derived from a user identifier and a passcode.

7. A method according to claim 1, wherein the wireless device includes either a desktop computer, a portable computer, or a mobile phone.

8. An apparatus comprising:
at least one processor; and
at least one memory including computer program code,
the at least one memory and the computer program code configured to, with the at least one processor, cause the apparatus to perform at least the following,
  detect, at a set-top box, a wireless device according to a predetermined communication protocol, wherein the set-top box has a slideshow application;
  establish a communication channel with the wireless device according to the communication protocol;
  receive, according to the communication protocol, a command message from the wireless device over the communication channel, wherein the command message specifies playback of a media resident on the wireless device via a set-top box;
  receive the media resident on the wireless device from the wireless device over the communication channel; and
  provide a slideshow at the set-top box based on the received media after receiving all media resident on the wireless device designated for the slideshow,
  wherein the set-top box is directly connected to the Internet,
  wherein the command message specifies the beginning and ending of the slideshow, and
  wherein a user is common to both the wireless device and the set-top box.

9. An apparatus according to claim 8, wherein the apparatus is further caused, at least in part, to:
  activate a digital frame mode of operation for the presentation of the slideshow,
  wherein in the digital frame mode, the slideshow continues to repeat with the media presented in sequence in which they are originally presented for the slideshow.

10. An apparatus according to claim 8, wherein the media is transported over the communication channel in one or more data messages, and includes a plurality of images, one or more audio files, one or more video files, or a combination thereof.

11. An apparatus according to claim 8, wherein the communication protocol specifies a predefined header of a fixed length, and the command message includes only the predefined header to indicate that the type of message is a command message.

12. An apparatus according to claim 11, wherein the predefined header includes,
  a transport field specifying transport mechanism used for the communication channel,
  a command field identifying a command message;
  a subcommand field specifying information about the command message; and
  a payload length field specifying a length of a payload of a command packet,
  wherein a packet is recognized as a command packet when the payload length field is zero.

13. An apparatus according to claim 8, wherein the apparatus is further caused, at least in part, to:
  receive a broadcast message as part of the detection of the wireless device, wherein the broadcast message includes a unique key derived from a user identifier and a passcode.

14. An apparatus according to claim 8, wherein the wireless device includes either a desktop computer, a portable computer, or a mobile phone.

15. A method comprising:
  invoking, at a wireless device, a slideshow application at a set-top box relating to presentation of a media, wherein the media is stored within the wireless device;
  generating a broadcast message for wireless transmission to the set-top box according to a predetermined communication protocol;
  establishing a communication channel with the set-top box according to the communication protocol;
  generating, according to the communication protocol, a command message for transmission over the communication channel to the set-top box, wherein the command message specifies playback of the media that is stored within the wireless device via the set-top box; and
  transferring the media that is stored within the wireless device over the communication channel to the set-top box for playback as a slideshow after all media is transferred,
  wherein the set-top box is directly connected to the Internet,
  wherein the command message specifies the beginning and ending of the slideshow, and
  wherein a user is common to both the wireless device and the set-top box.

16. A method according to claim 15,
  wherein the communication protocol specifies a predefined header of a fixed length, and the command message includes only the predefined header to indicate that the type of message is a command message, and
  wherein the predefined header includes,
  a transport field specifying transport mechanism used for the communication channel,
  a command field identifying a command message;
  a subcommand field specifying information about the command message; and
  a payload length field specifying a length of a payload of a command packet,
  wherein a packet is recognized as a command packet when the payload length field is zero.

17. A method according to claim 15, wherein the broadcast message includes a unique key derived from a user identifier and a passcode.

18. A method according to claim 15, further comprising:
  generating another command message specifying activation of a digital media frame mode of operation for the set-top box with respect to the presentation of the media.

19. A method according to claim 15, further comprising:
  activating a digital frame mode of operation for presentation of the slideshow,
  wherein in the digital frame mode, the slideshow continues to repeat with the media presented in sequence in which they are originally presented for the slideshow.

* * * * *